(12) United States Patent
Vasseur et al.

(10) Patent No.: US 9,130,863 B2
(45) Date of Patent: *Sep. 8, 2015

(54) MANAGING HOST ROUTES FOR LOCAL COMPUTER NETWORKS WITH A PLURALITY OF FIELD AREA ROUTERS

(71) Applicant: Cisco Technology, Inc., San Jose, CA (US)

(72) Inventors: Jean-Philippe Vasseur, Saint Martin d'Uriage (FR); Jonathan W. Hui, Belmont, CA (US); Stefano Previdi, Rome (IT); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/311,537

(22) Filed: Jun. 23, 2014

(65) Prior Publication Data

US 2014/0304427 A1    Oct. 9, 2014

Related U.S. Application Data

(63) Continuation of application No. 13/176,301, filed on Jul. 5, 2011, now Pat. No. 8,799,510.

(51) Int. Cl.
*G06F 15/173* (2006.01)
*H04L 12/707* (2013.01)
*H04L 12/715* (2013.01)

(52) U.S. Cl.
CPC ............... *H04L 45/22* (2013.01); *H04L 45/64* (2013.01)

(58) Field of Classification Search
CPC ................................ H04L 45/22; H04L 45/64
USPC .......................... 709/223, 224, 225, 226, 239
See application file for complete search history.

(56) References Cited

U.S. PATENT DOCUMENTS

| | | |
|---|---|---|
| 7,185,107 B1 | 2/2007 | Cassar |
| 7,483,387 B2 | 1/2009 | Guichard et al. |
| 7,512,063 B2 | 3/2009 | Vasseur et al. |
| 7,515,529 B2 | 4/2009 | Vasseur et al. |
| 7,554,996 B2 | 6/2009 | Previdi et al. |

(Continued)

OTHER PUBLICATIONS

"RPL: IPv6 Routing Protocol for Low Power and Lossy Networks" <draft-ietf-roll-rpl-19> by Winter, at al. (Mar. 13, 2011 version).

(Continued)

*Primary Examiner* — Jonathan Bui
(74) *Attorney, Agent, or Firm* — Parker Ibrahim & Berg LLC; James M. Behmke; Stephen D. LeBarron

(57) ABSTRACT

In one embodiment, a particular field area router (FAR), in a local computer network (e.g., a mesh network) having a plurality of FARs, advertises a common subnet prefix assigned to the local computer network into a global computer network. Each of the plurality of FARs of the local computer network is configured to accept any traffic destined to the local computer network, and a tunnel overlay is built among the plurality of FARs. Upon receiving a packet at the particular FAR destined to a particular device in the local computer network, and in response to the particular FAR not having a host route to the particular device, it forwards the packet on the tunnel overlay to another of the plurality of FARs of the local computer network.

17 Claims, 16 Drawing Sheets

(56) References Cited

U.S. PATENT DOCUMENTS

| | | | |
|---|---|---|---|
| 7,830,787 | B1 | 11/2010 | Wijnands et al. |
| 7,855,953 | B2 | 12/2010 | Filsfils et al. |
| 1,001,355 | A1 | 1/2011 | Westberg et al. |
| 7,886,079 | B2 | 2/2011 | Vasseur et al. |
| 1,024,313 | A1 | 10/2011 | Amir et al. |
| 2005/0171937 | A1 | 8/2005 | Hughes et al. |
| 2008/0186962 | A1 | 8/2008 | Sinha |
| 2008/0301354 | A1* | 12/2008 | Bekooij .................. 711/100 |
| 2009/0034557 | A1 | 2/2009 | Fluhrer et al. |
| 2010/0238934 | A1 | 9/2010 | Bharali et al. |
| 2011/0013557 | A1* | 1/2011 | Westberg et al. ............ 370/328 |
| 2012/0263185 | A1 | 10/2012 | Bejerano et al. |

OTHER PUBLICATIONS

"Routing Metrics used for Path Calculation in Low Power and Lossy Networks" <draft-ietf-rollrouting-metrics-19> by Vasseur, et al. (Mar. 1, 2011 version).

"RPL Objective Function 0" <draft-ietf-roll-of0-11> by Thubert (May 5, 2011 version).

"The Minimum Rank Objective Function with Hysteresis" <draft-ietf-roll-minrank-hysteresis-of-03> by O. Gnawali et al. (May 3, 2011 version).

Vasseur, et al., "Intermediate System to Intermediate System (IS-IS) Extensions for Advertising Router Information", IETF Network Working Group, Request for Comments: 4971, Jul. 2007, 10 pages.

\* cited by examiner

MANAGING HOST ROUTES FOR LOCAL COMPUTER NETWORKS WITH A PLURALITY OF FIELD AREA ROUTERS

RELATED APPLICATION

This application is a continuation application of U.S. application Ser. No. 13/176,301, filed on Jul. 5, 2011, by Vasseur, et al., the contents of which are hereby incorporated by reference.

TECHNICAL FIELD

The present disclosure relates generally to computer networks, and, more particularly, to mesh networks with a plurality of field area routers (FARs).

BACKGROUND

Large-scale mesh networks, such as low power and lossy networks (LLNs), are an important component of sensor networks, such as for advance metering infrastructure (AMI) networks and Urban networks. Mesh networks may often be composed of 1000-5000 nodes in a mesh network that is connected to a global computer network, e.g., an Internet Protocol (IP) network such as a wide area network (WAN), using one or more Field Area Routers (FARs). Using multiple FARs to provide access for a single mesh network is desirable as it removes a single point of failure, reduces the average diameter of the network, reduces average communication latency, and increases aggregate throughput when communicating with devices outside the network.

A routing protocol, such as the Routing Protocol for LLNs (RPL), may be used within the mesh network in order to deliver packets to FARs and other mesh devices. For example, RPL is a distance vector routing protocol that builds a Destination Oriented Directed Acyclic Graph (DODAG, or simply DAG) from the FARs such that each mesh device configures a default route towards one or more FARs. In this configuration, a device can freely switch between FARs with little impact on traffic going outside the mesh network since every FAR also has a default route configured towards its WAN exit point.

One challenge associated with this topology is presented by traffic coming from outside the mesh network and destined to devices inside the mesh network. For instance, devices in a mesh may be connected to multiple FARs via different DAGs for redundancy purposes. Usually such DAGs are as diverse as possible but they may partially overlap. Also, some nodes may be attached to a subset of these DAGs: that is, a device may only communicate through a subset of FARs, and each FAR only maintains routes for a subset of devices within the mesh network. As a result, when routing packets into a mesh network, it is necessary to determine which FAR contains the route to the destination. Furthermore, there are a number of reasons why a node may move from one FAR to another FAR (failure of the FAR acting as the DAG root, more optimal path to the WAN/backbone, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
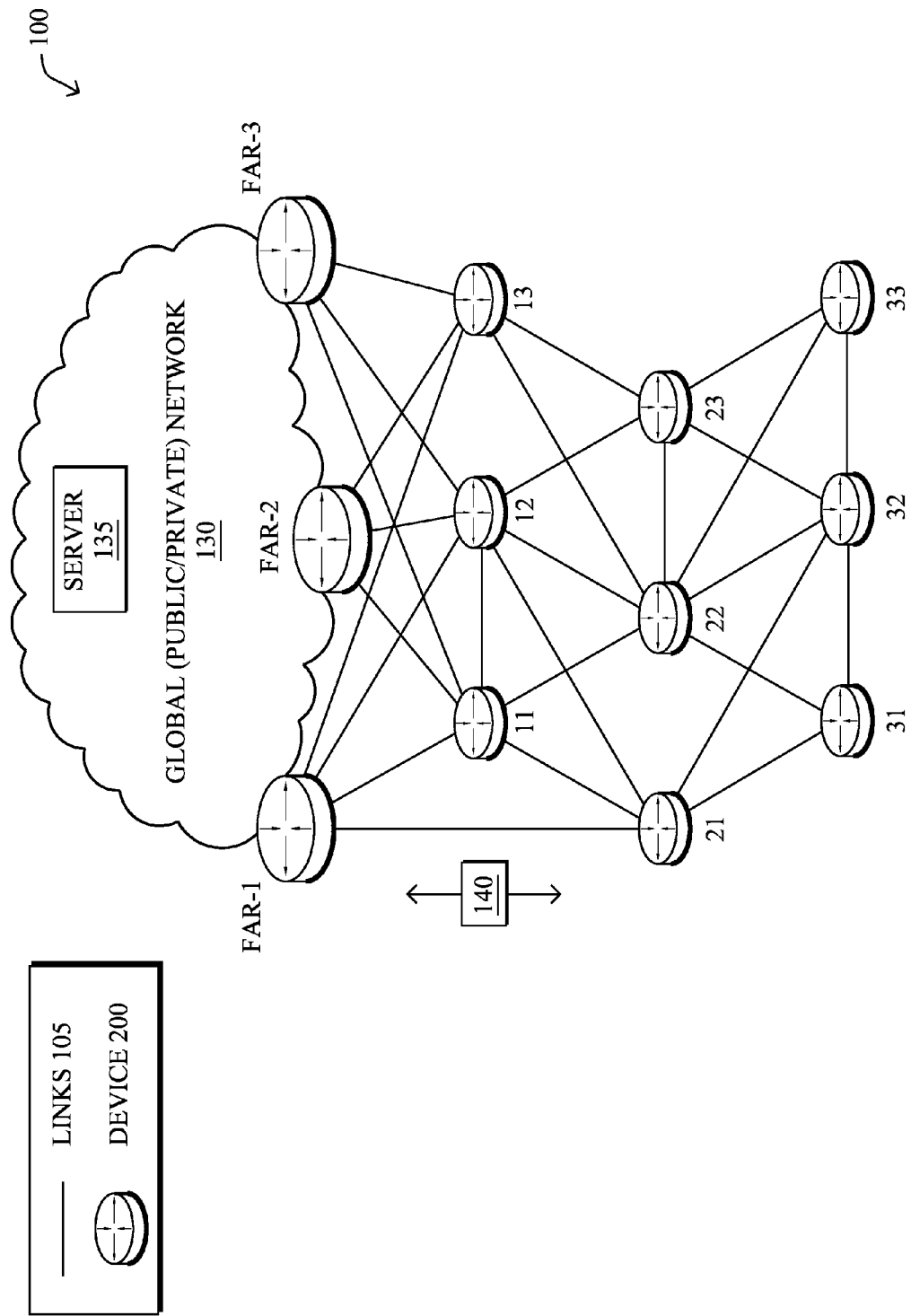
FIG. 1 illustrates an example communication network.

According to one or more embodiments of the disclosure, a particular field area router (FAR), in a local computer network (e.g., mesh network) having a plurality of FARs, advertises a common subnet prefix assigned to the local computer network into a global computer network. Each of the plurality of FARs of the local computer network is configured to accept any traffic destined to the local computer network, and a tunnel overlay is built among the plurality of FARs. Upon receiving a packet at the particular FAR destined to a particular device in the local computer network, and in response to the particular FAR not having a host route to the particular device, it forwards the packet on the tunnel overlay to another of the plurality of FARs of the local computer network.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 as described in FIG. 2 below, such as field area routers (FARs), "FAR-1," "FAR-2," and "FAR-3," as well as other nodes/devices labeled as "11," "12," . . . "33" of a local computer network, e.g., a mesh network. The nodes 200 may be interconnected by various methods of communication. For instance, the links 105 may be shared media (e.g., wireless links, PLC links, etc.), where certain nodes 200, such as, e.g., routers, sensors, computers, etc., may be in communication with other nodes 200, e.g., based on distance, signal strength, current operational status, location, etc. Also, the FARs may be interconnected with a global (e.g., private/public) computer network 130, which may have one or more servers or head-end applications 135. The connection to the global computer network may also be a shared-media connection (e.g., cellular links), though may also be a wired connection. Those skilled in the art will understand that any number of nodes, devices, links, etc. may be used in the computer network, and that the view shown herein is for simplicity.

Data packets 140 (e.g., traffic and/or messages sent between the devices/nodes) may be exchanged among the nodes/devices of the computer network 100 using predefined network communication protocols such as certain known wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
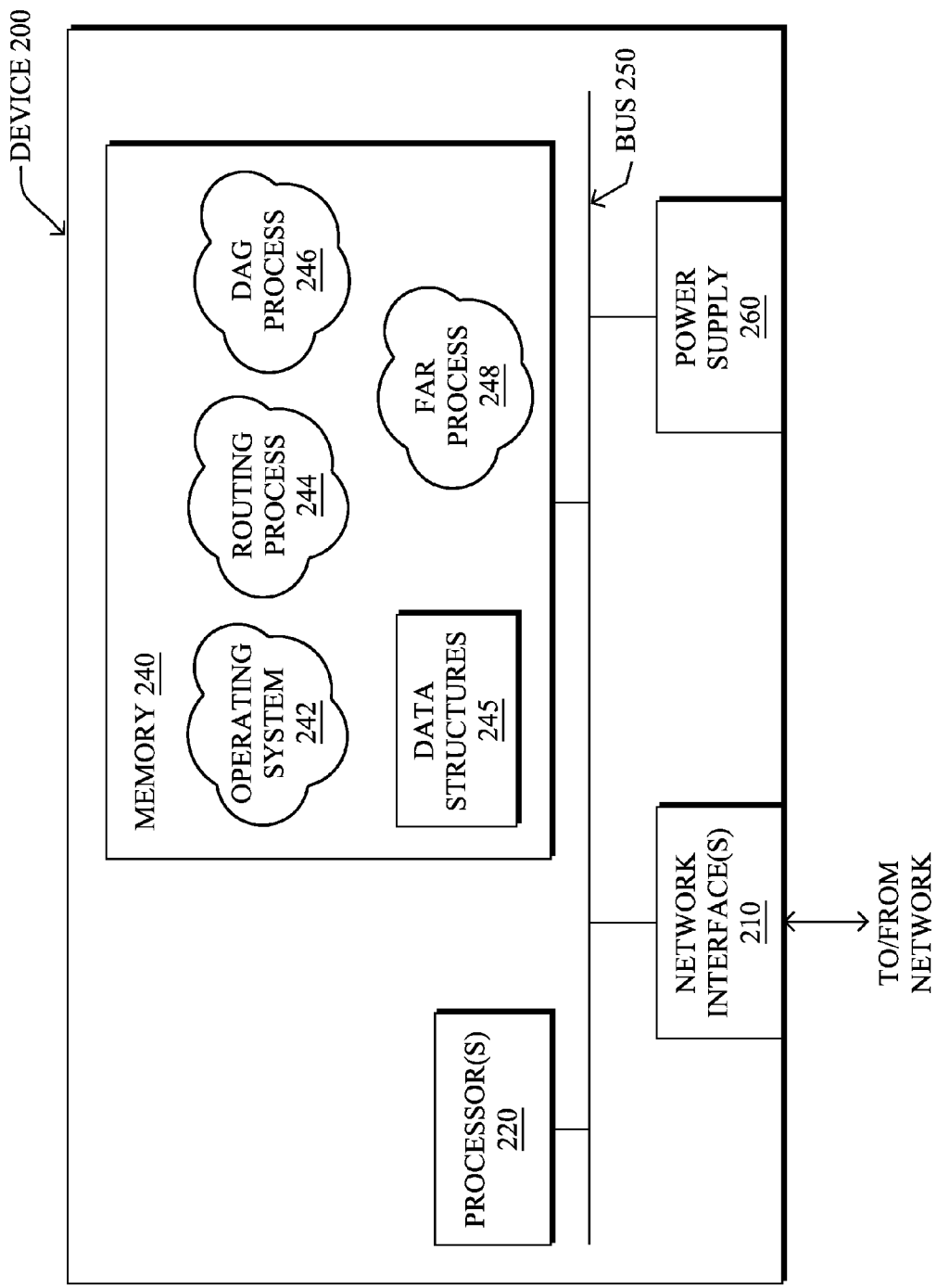
FIG. 2 illustrates an example network device/node.

FIG. 2 is a schematic block diagram of an example node/device 200 that may be used with one or more embodiments described herein, e.g., particularly as a FAR shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100 (that is, to both the local and global computer networks). The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, a directed acyclic graph (DAG) process 246, and an illustrative FAR process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes (e.g., routing process 244 and DAG process 246 each being a part of a generic FAR process 248).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-11> by Thubert (May 5, 2011 version) and "The Minimum Rank Objective Function with Hysteresis" <draft-ietf-roll-minrank-hysteresis-of-03> by O. Gnawali et al. (May 3, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
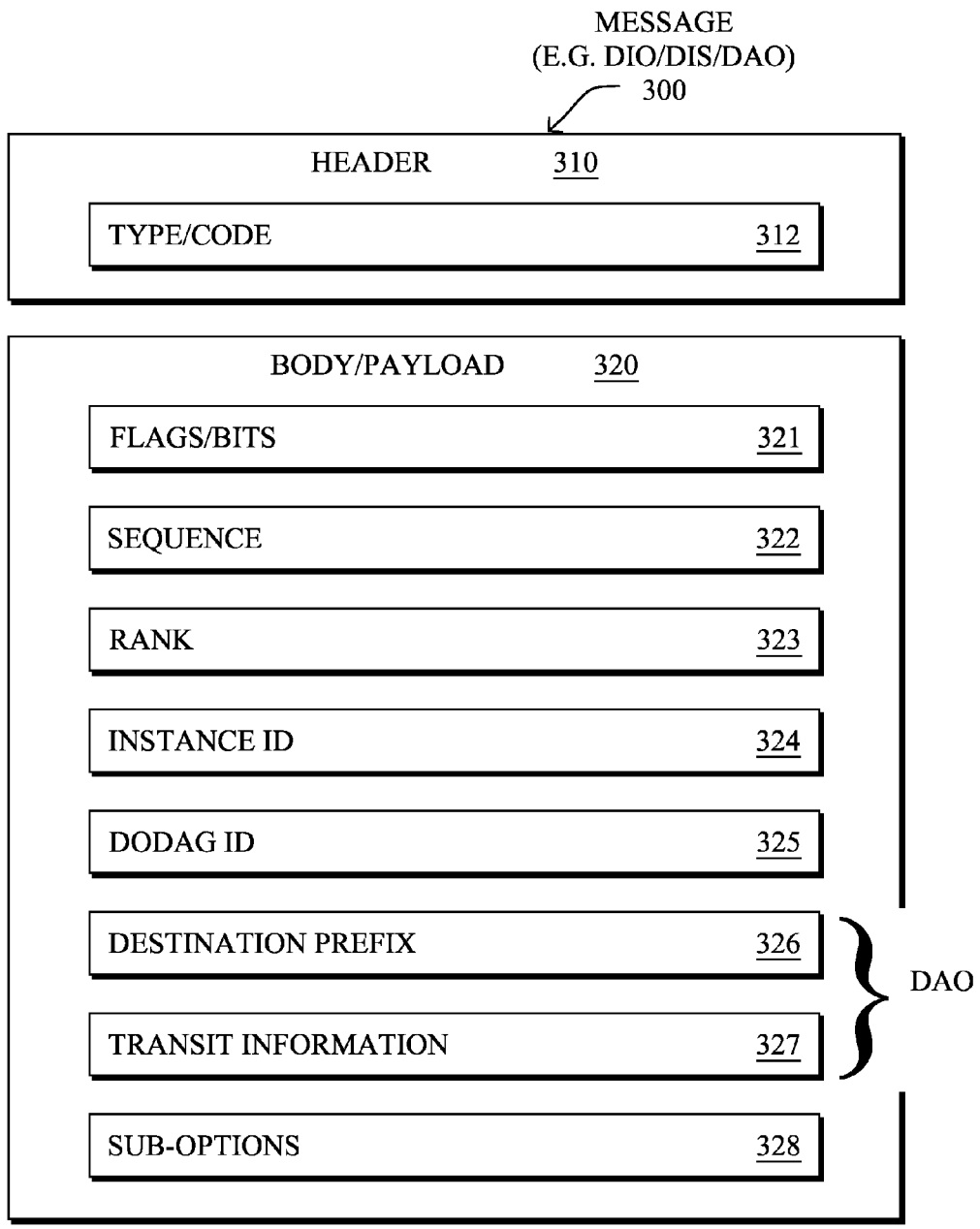
FIG. 3 illustrates an example message format.

FIG. 3 illustrates an example simplified control message format 300 that may be used for discovery and route dissemination when building a DAG, e.g., as a DIO, DAO, or DIS message. Message 300 illustratively comprises a header 310 with one or more fields 312 that identify the type of message (e.g., a RPL control message), and a specific code indicating the specific type of message, e.g., a DIO, DAO, or DIS. Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For any type of message 300, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields 328 may be used to carry other certain information within a message 300, such as indications, requests, capabilities, lists, notifications, etc., as may be described herein, e.g., in one or more type-length-value (TLV) fields.

Figure 4A:
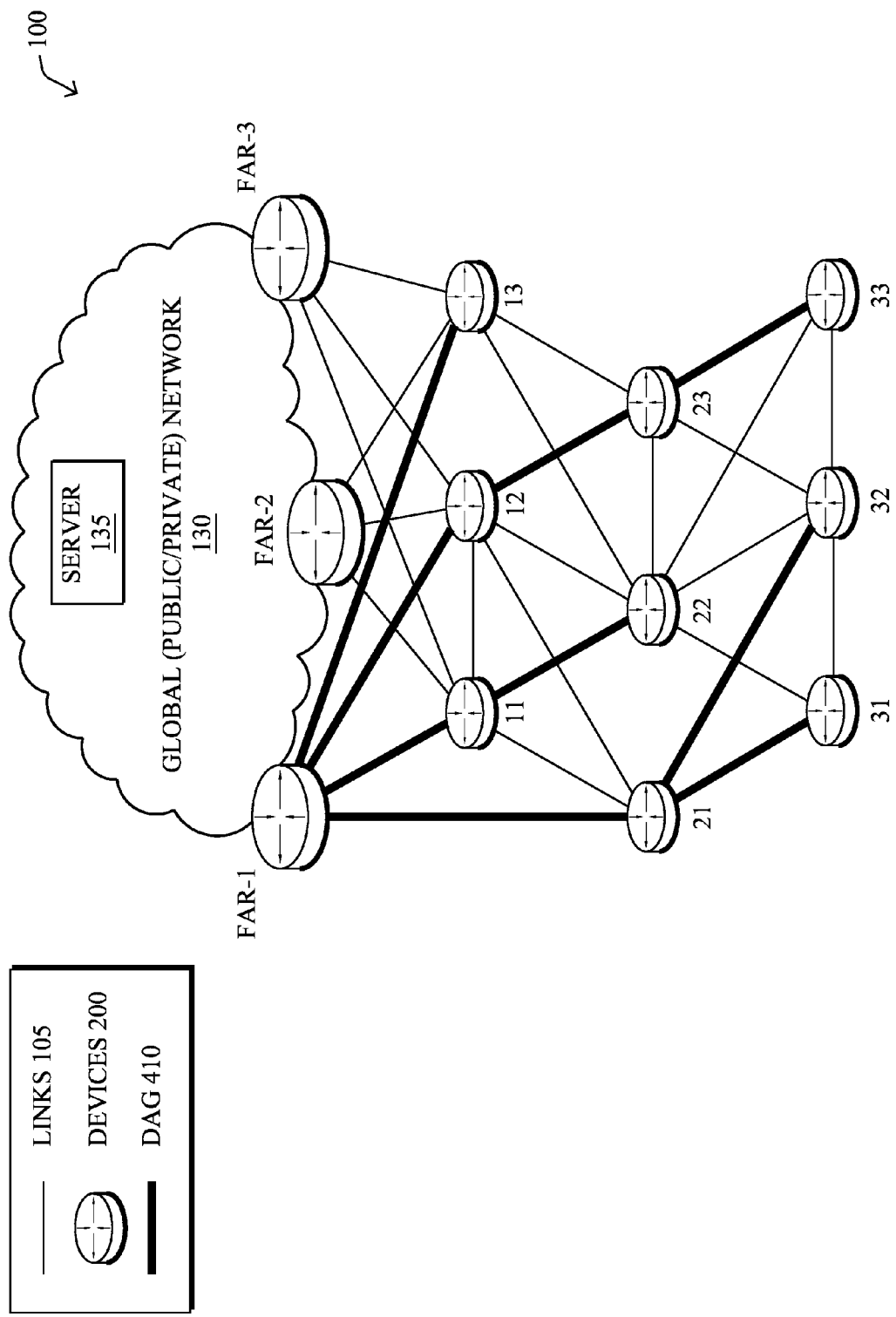
FIG. 4A illustrates an example directed acyclic graph (DAG) in the communication network of FIG. 1.

FIG. 4A illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as bolded lines), which extends from the root node (e.g., a FAR) toward one or more leaf nodes (nodes without children). Traffic/packets 140 (shown in FIG. 1) may then traverse the DAG 410 in either the upward direction toward the root or downward toward the leaf nodes, particularly as described herein.

As noted above, large-scale mesh networks, such as LLNs, are an important component of sensor networks, such as for AMI networks and Urban networks. Mesh networks may often be composed of 1000-5000 nodes in a mesh network that is connected to a global computer network 130 using one or more Field Area Routers (FARs). Using multiple FARs to provide access for a single mesh network is desirable as it removes a single point of failure, reduces the average diameter of the network, reduces average communication latency, and increases aggregate throughput when communicating with devices outside the network.

A routing protocol, such as RPL, may be used within the mesh network in order to deliver packets to FARs and other mesh devices. For example, RPL may be used to build a DAG from the each of the FARs such that each mesh device configures a default route towards one or more FARs. That is, devices in a mesh may be connected to multiple FARs via different DAGs, e.g., for redundancy purposes. In this configuration, a device can freely switch between FARs with little impact on traffic going outside the mesh network since every FAR also has a default route configured towards its WAN interface.

Figure 4B:
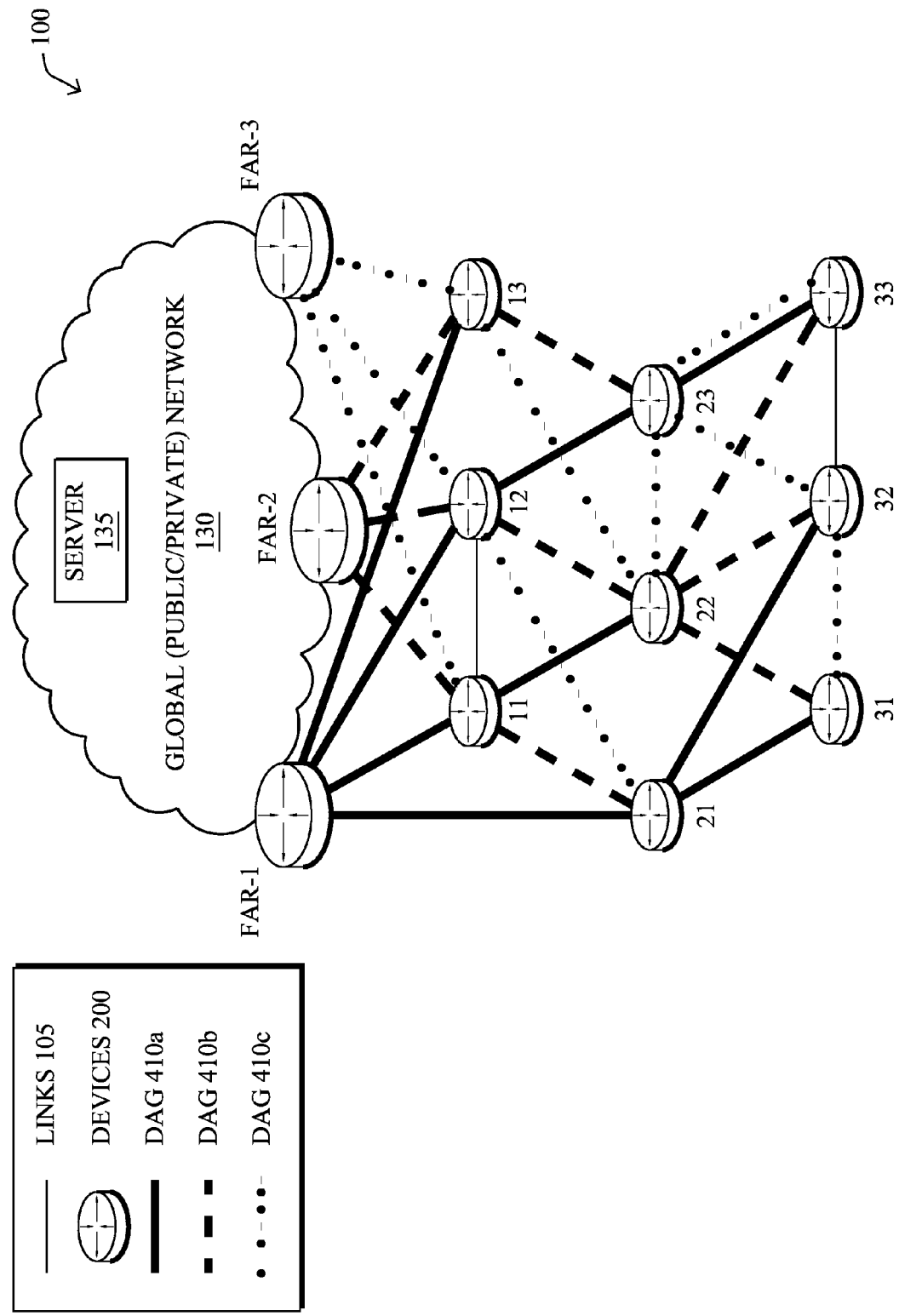
FIG. 4B illustrates an example of multiple DAGs.

FIG. 4B, for example, illustrates the network 100 with a DAG 410 (410a, 410b, and 410c) to each of the FARs in the mesh network (FAR-1, FAR-2, FAR-3, respectively). As mentioned above, such DAGs are usually as diverse as possible, but they may partially overlap. Also, some nodes may be attached to a subset of these DAGs, thus only communicating through a subset of FARs, and each FAR only maintains routes for a subset of devices within the mesh network. As a result, when routing packets into a mesh network, it is necessary to understand which FAR contains the route to the destination. Furthermore, there are a number of reasons why a node may move from one FAR to another FAR (failure of the FAR acting as the DAG root, more optimal path to the WAN/backbone, etc.).

One approach is for every FAR to advertise their complete collection of host routes on the WAN link using a typical routing protocol (e.g., Open Shortest Path First or "OSPF"). However, such a design would simply not be applicable to large LLNs. For example, in some cases the WAN link connecting the FAR to the backbone may be a cellular link and billed based on the amount of data exchanged across that link. Also, even when the WAN link is not a limitation, redistributing potentially dozens of thousands of host routes in the Interior Gateway Protocol (IGP) (e.g., link state advertisements/packets) is not viable.

Managing Host Routes with Multiple FARs

The techniques herein efficiently provide routes to devices within the LLN, while minimizing the amount of communication that must occur over the link between the local computer network (e.g., mesh network) and global computer network (e.g., generally referred to as a "WAN link" herein). In particular, the techniques minimize the number of host routes that need to be advertised over the WAN link, and also minimize the occurrence of forwarding packets (e.g., and/or datagrams) destined to devices within the LLN over the WAN link. That is, in the ideal case, a packet sourced outside the LLN and destined for a device inside the LLN should only traverse a WAN link once.

Specifically, according to one or more embodiments of the disclosure as described in detail below, field area routers (FARs) each advertise a common subnet prefix assigned to the mesh network (e.g., LLN) into a global computer network, and are each configured to accept any traffic destined to the mesh network. By building a tunnel overlay among the plurality of FARs, upon receiving a packet at the particular FAR destined to a particular device in the mesh network, a FAR may forward the packet on the tunnel overlay to another of the plurality of FARs of the mesh network in response to not having a host route to the particular device.

Illustratively, the techniques described herein may be performed by hardware, software, and/or firmware, such as in accordance with the FAR process 248, which may contain computer executable instructions executed by the processor 220 to perform functions relating to the novel techniques described herein, e.g., in conjunction with routing process 244 (and/or DAG process 246). For example, the techniques herein may be treated as extensions to conventional protocols, such as the RPL protocol or various communication protocols, and as such, may be processed by similar components understood in the art that execute those protocols, accordingly.

Figure 5:
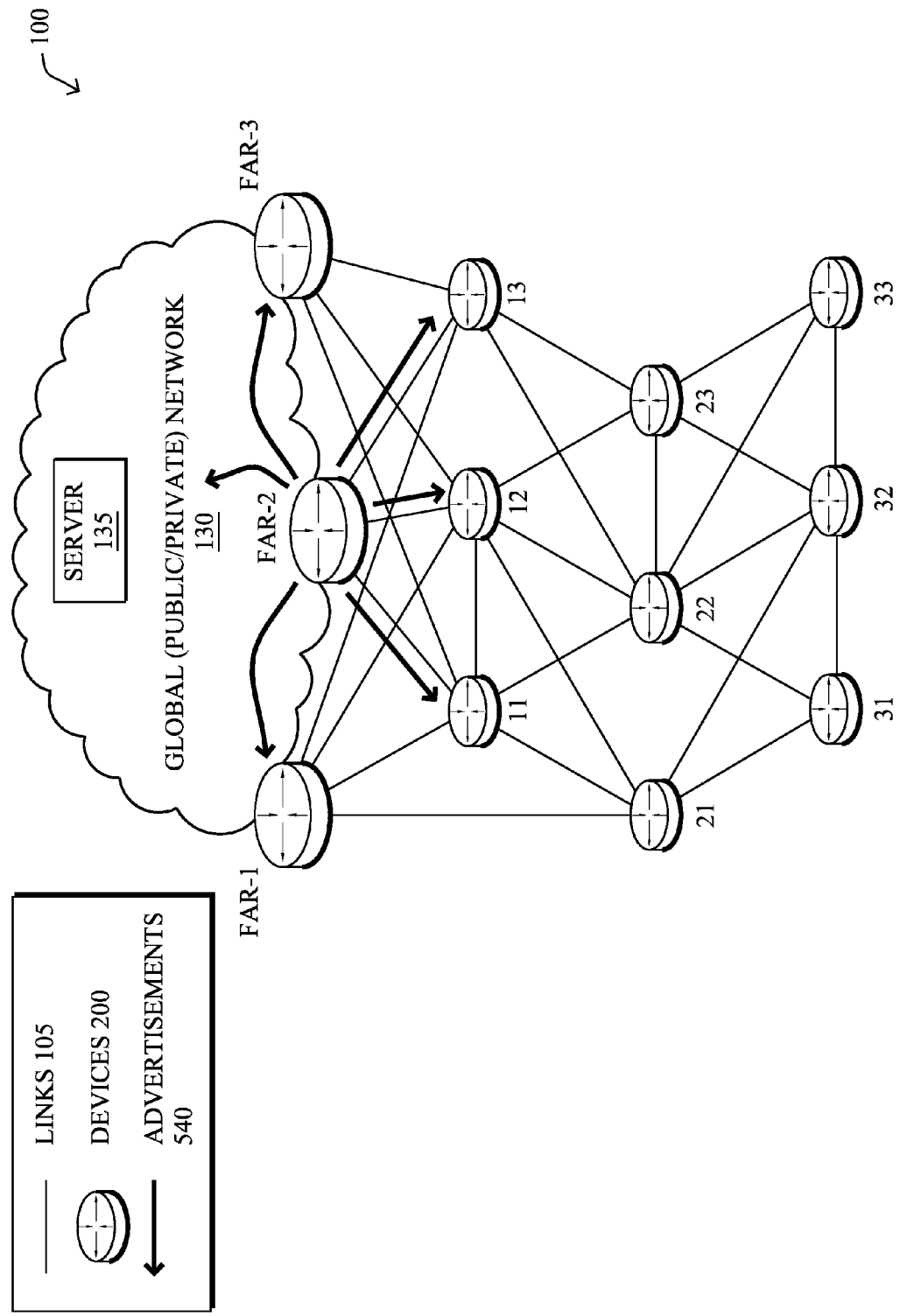
FIG. 5 illustrates an example advertisement exchange.

FIG. 5 illustrates an example of advertisement transmission (advertisements 540), as may be generally appreciated by those skilled in the art. Operationally, according to the techniques herein, each FAR providing WAN connectivity to the same mesh network (e.g., a personal area network or "PAN" in IEEE 802.15.4) advertises a single common prefix assigned to the mesh network (called the common subnet prefix). As described below, each of the plurality of FARs of the mesh network is configured to accept any traffic destined to the mesh network. In addition, each FAR is assigned a prefix that falls within, i.e., is a subset from, the common subnet prefix (called the FAR prefix). Each FAR advertises its FAR prefix across the WAN link into the global computer network, as well as into the mesh network. Whenever possible, devices configure their address(es) (e.g., an IPv6 address) based on the FARs that they are communicating through.

Figure 6:
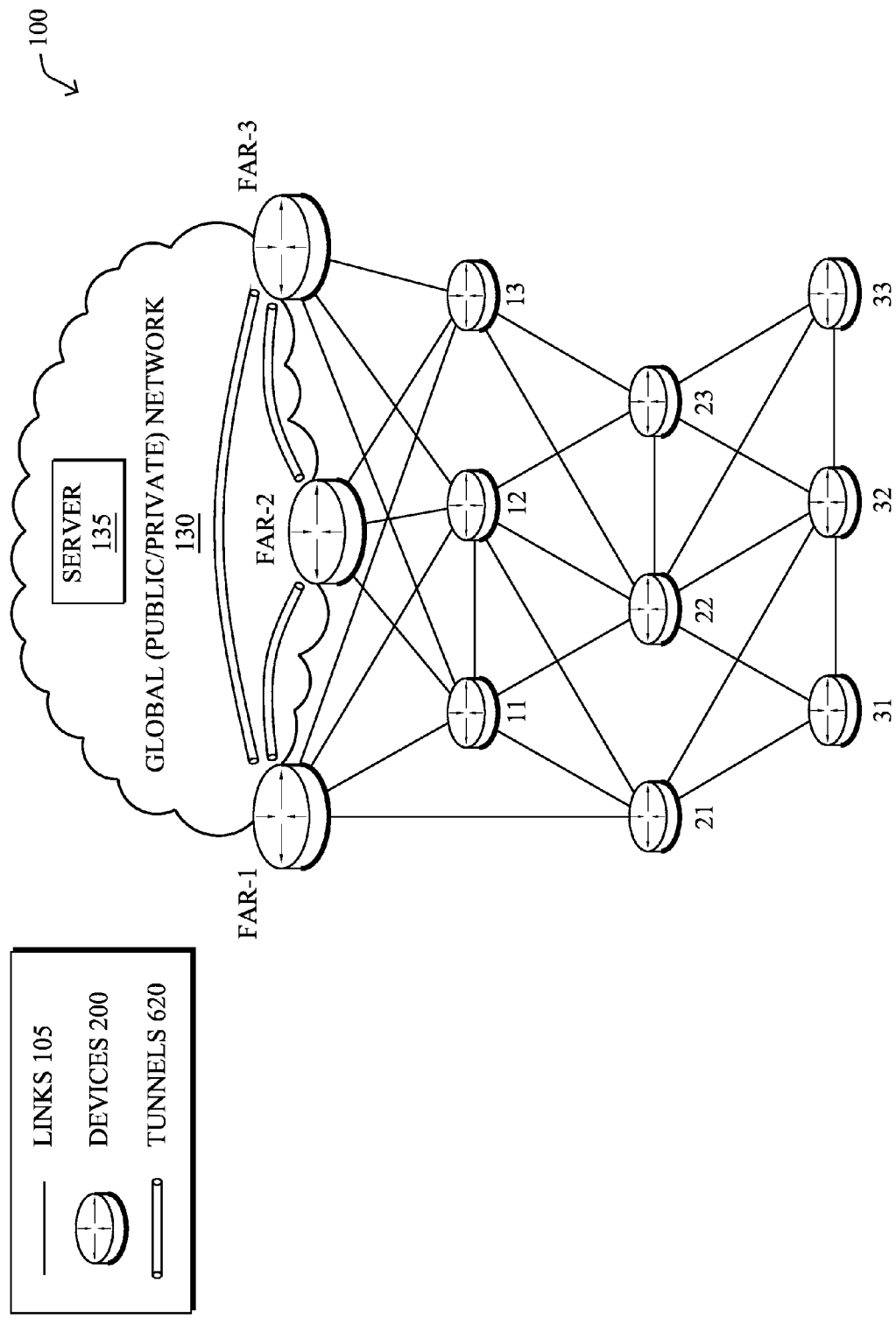
FIG. 6 illustrates example tunnels between field area routers (FARs)

In accordance with the illustrative embodiments herein, each FAR also dynamically discovers other FARs attached to the same network in order to build a tunnel overlay with the other FARs. Once a FAR has discovered another FAR serving the same LLN, it automatically sets up a tunnel to its peer serving that LLN. Tunnels, generally, may be based on any suitable encapsulation technique, such as, e.g., generic route encapsulation (GRE), multi-protocol label switching (MPLS), IP-in-IP, etc. FIG. 6 illustrates an example overlay of tunnels 620 between each of the FARs. Note that in certain embodiments, the tunnels 620 may be a fully connected arrangement (each FAR has a tunnel to each other FAR, or in a ring arrangement (each FAR has one tunnel into the FAR, and one tunnel out of the FAR). As shown, with only three FARs, both a fully connected arrangement and ring arrangement are created.

Note that an LLN can be identified based on its DODAG ID as identified by RPL. Also, FAR discovery may be based on use of an IGP advertisement announcing the capability of a device to act as a FAR for the LLN. A new (sub-)TLV is defined that is carried in an OSPF opaque LSA (link state advertisement) or IS-IS Router Capability TLV that identifies the FAR IP address used for the tunnel endpoint and the LLN ID (e.g., DODAG ID). In addition a new bit may be set (e.g., for Host route_announce) that is used to activate an IGP session over the tunnels interconnecting FARs as explained below.

Using the tunnel overlay, any FAR can receive traffic destined for the LLN (any device within the LLN) over the WAN link, where if the FAR does not have a host route for the destination, it can forward the packet to another FAR using the tunnel overlay. In particular, when a FAR receives a packet over the WAN link destined for a particular device in the mesh network (e.g., LLN), the FAR first determines if it has a host route for the destination device into the LLN. If so, the FAR will forward the packet into the LLN toward the destination device according to the host route.

Figure 7A:
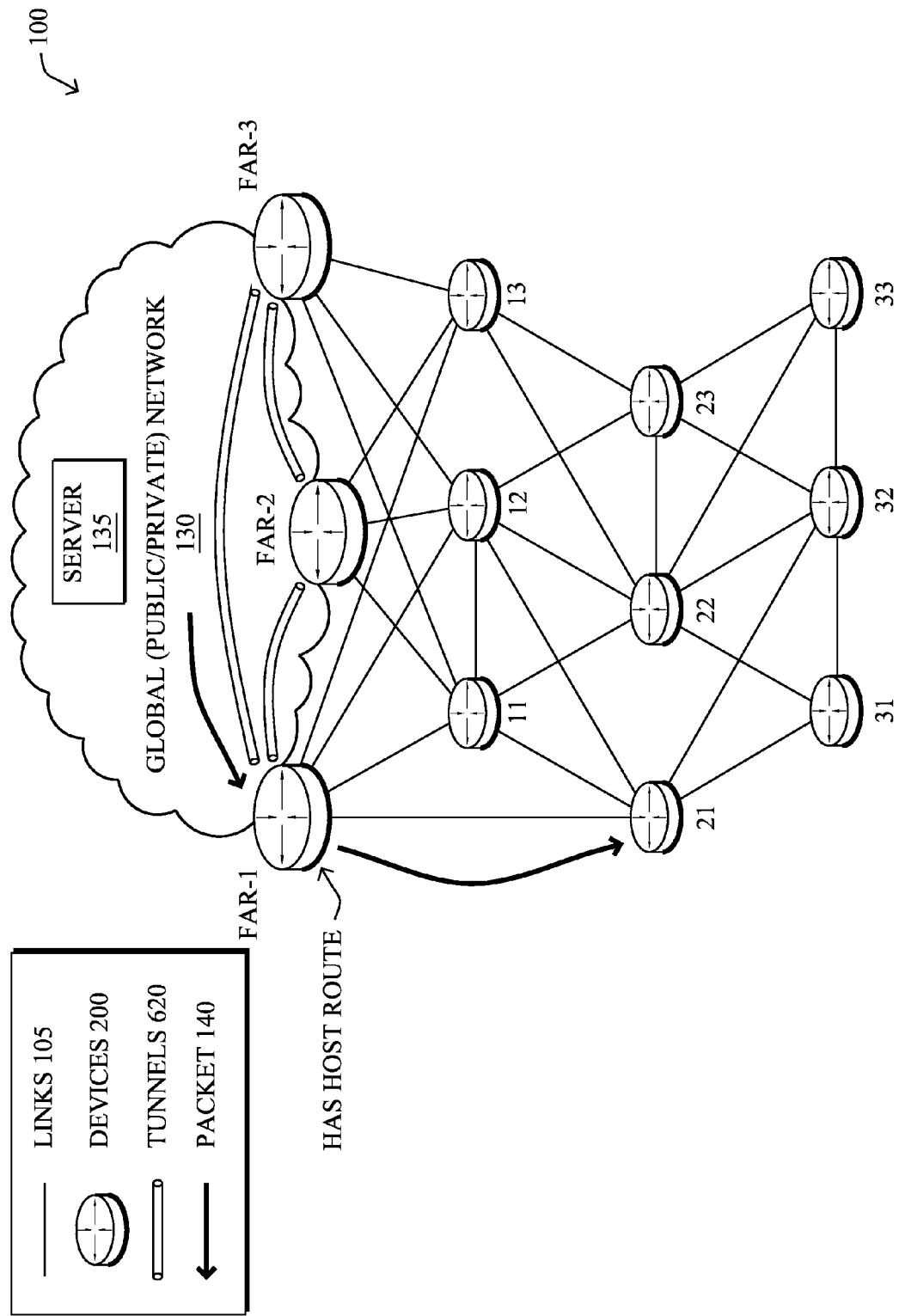
FIGS. 7A-7D illustrate an example handling of a packet by the FARs.
Figure 7B:
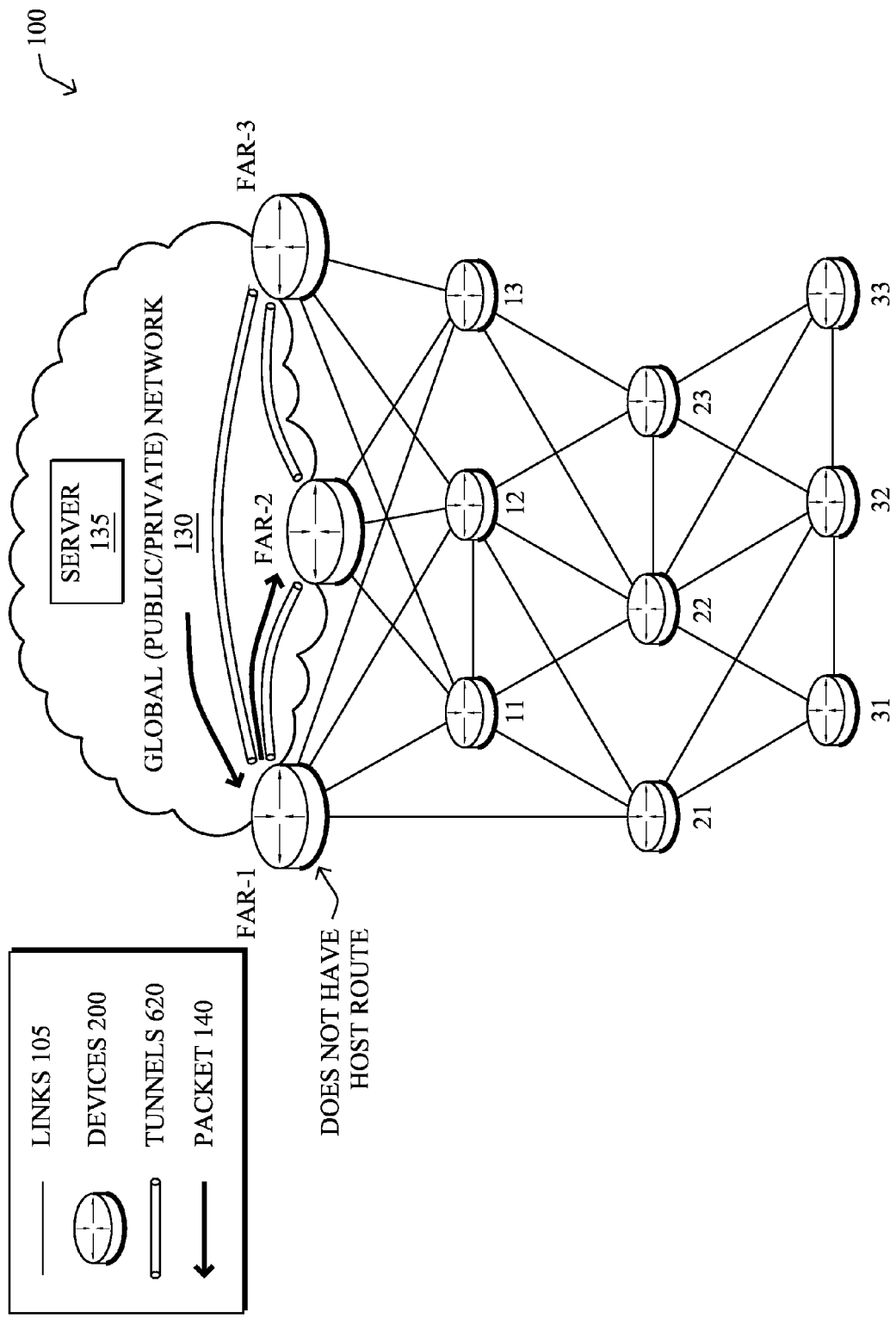
Figure 7C:
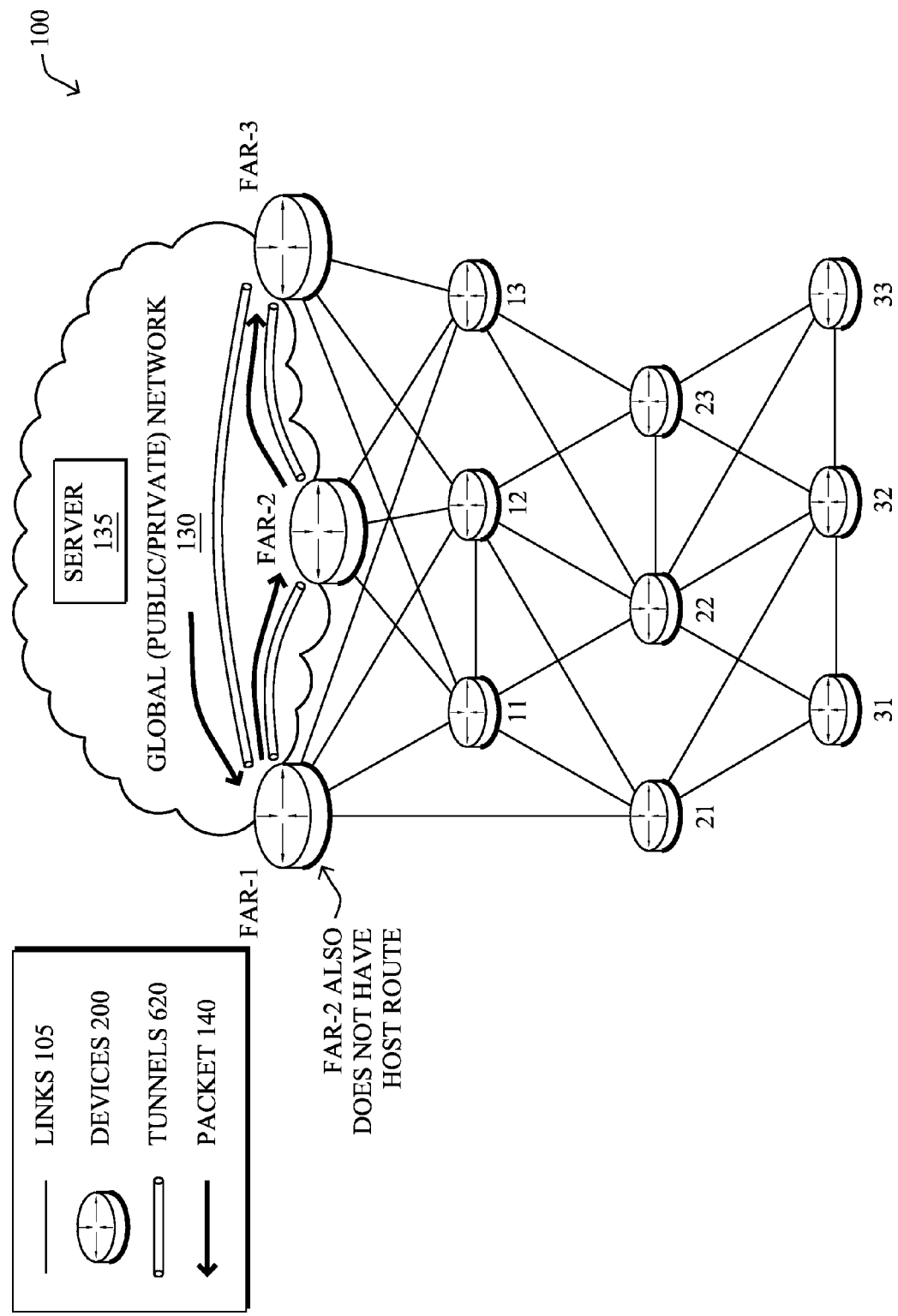
Figure 7D:
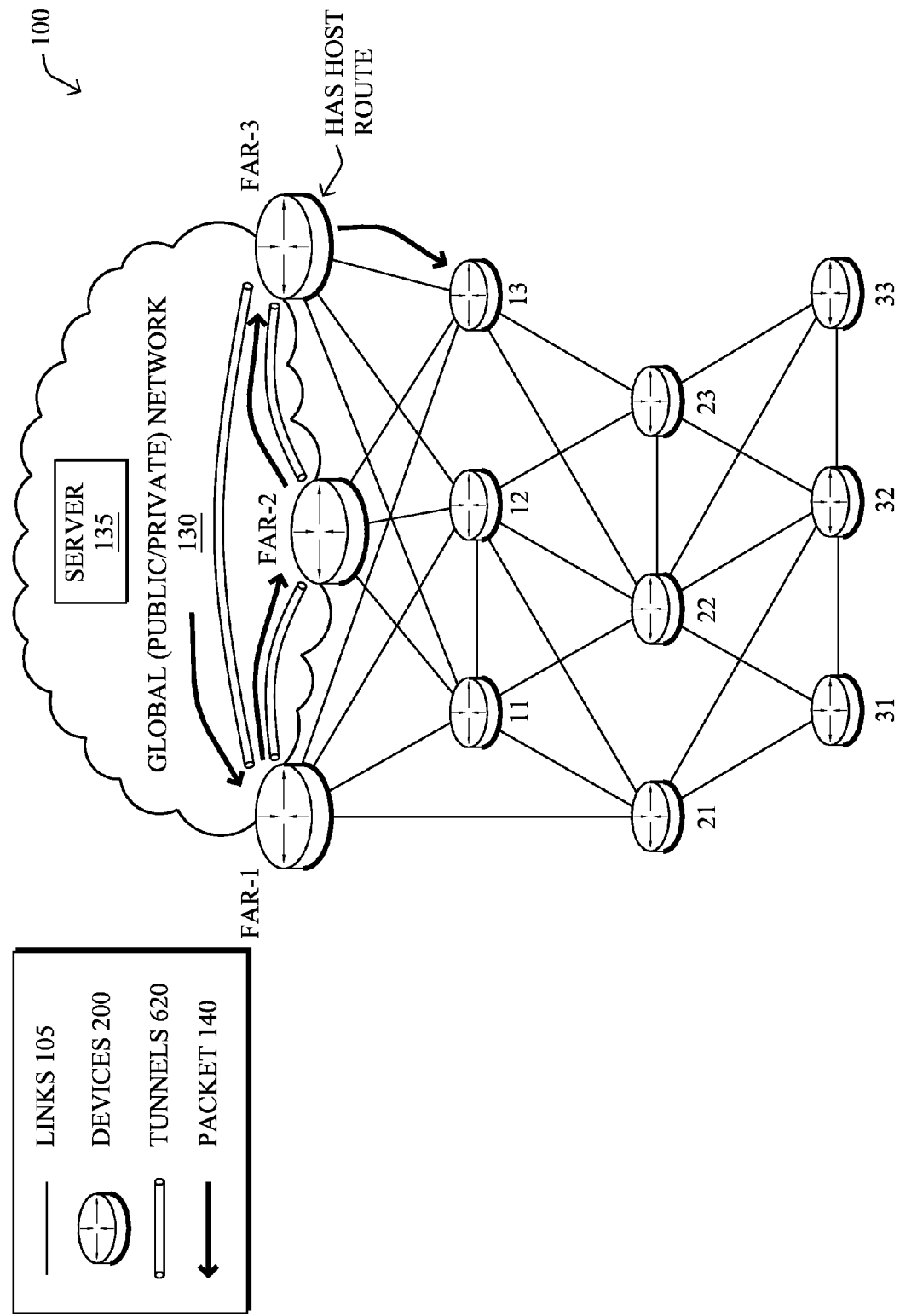

For example, FIG. 7A illustrates a received packet 140 at FAR-1. Assuming that FAR-1 has the host route for a destination of the packet (e.g., node 31), then FAR-1 forwards the packet into the LLN based on that host route, accordingly. If, on the other hand, the FAR does not have a host route into the LLN for the destination device, it selects one of the other FARs and forwards the packet to the selected FAR (e.g., FAR-2) using the tunnel overlay, as illustrated in FIG. 7B. Note that as shown in FIG. 7C, FAR-2 may also not have the required host route for the packet 140 (e.g., assuming no IGP is running over the tunnels, as described below), and may again forward the packet to another FAR (e.g., FAR-3) on the tunnel overlay. Eventually (assuming a valid destination and updated routing instance), a FAR will receive the packet from the tunnel overlay that does have the host route for the destination device, such as FAR-3 as shown in FIG. 7D. At this time, the responsible FAR forwards the packet 140 (decapsulated from the tunnel overlay) into the LLN toward the destination device, accordingly. Note that in this manner, the packet received at a FAR may be from the global computer network (WAN link) or from another FAR of the mesh network (over the tunnel overlay 620).

The tunnel overlay may be configured in different ways to support different forwarding policies. In a first embodiment, the FARs may be fully connected by the tunnels 620. When the tunnel overlay is fully connected in this configuration, a FAR may select a specific next-hop FAR to which to forward the packet on the tunnel overlay at random. As a beneficial enhancement, the selection may be based on the specific FAR not having already received the packet. That is, when forwarding a packet, the FAR encapsulates the packet with another header and includes a header extension that indicates what FARs have been traversed.

Figure 8A:
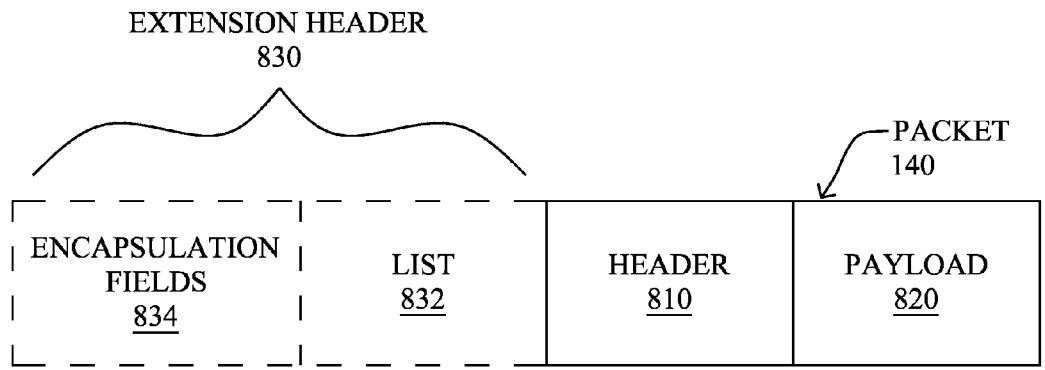
FIGS. 8A-8B illustrate example packet formats.

FIG. 8A, for example, illustrates an example packet 140 (with original header 810 and payload 820), further having an extension header 830 comprising the list 832 showing which FARs have already been traversed, and a set of encapsulation headers (e.g., tunnel labels) 834 for forwarding the packet on the tunnels 620. FARs receiving encapsulated packets through a tunnel decapsulate the packet, and if the FAR has a host route for the destination, it forwards the packet into the LLN. Otherwise, the FAR re-encapsulates the packet, adds its address to the extension header list 832 (thus maintaining the list of FARs that have already received the packet), and chooses another FAR that is not yet listed in the extension header.

Figure 8B:
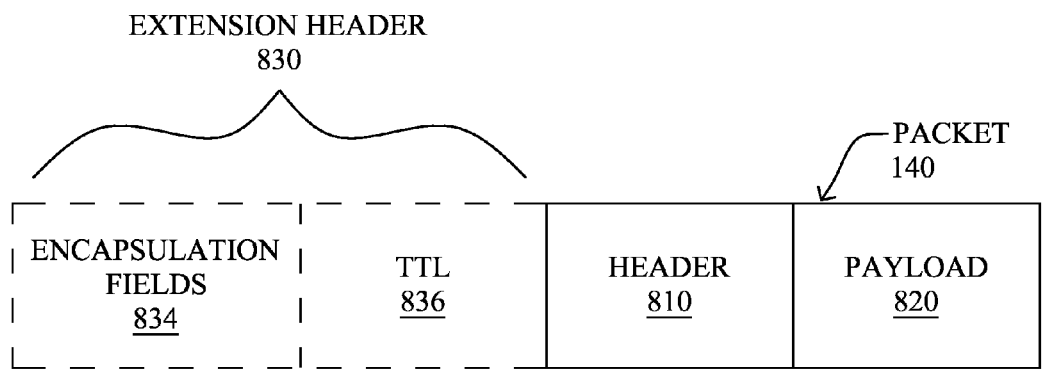

In a second embodiment, the tunnel overlay may be arranged in a ring topology. In the configuration where the tunnel overlay is a ring, a FAR selects the next-hop FAR based on the next FAR in the ring. Here, with reference now to FIG. 8B, when forwarding a packet, the FAR without the appropriate host route encapsulates the packet 140 with another IP header 830, and sets a time-to-live (TTL) value 836 to the number of hops remaining in the ring. When first forwarding a packet, the TTL may be equal to the number of FARs in the ring. FARs receiving encapsulated packets through a tunnel 620 decapsulate the packet, and if the FAR has the appropriate host route for the destination device, it forwards the packet into the LLN. Otherwise, the FAR re-encapsulates the packet and sets the TTL to one less than the value received prior to forwarding the packet on the tunnel overlay to the next FAR on the ring. By maintaining the TTL value in the forwarded packet in this manner, the packet is thus prevented from circling the ring more than once.

In still a third embodiment, the FARs may be executing/maintaining an IGP instance using the tunnel overlay to distribute host routes among the plurality of FARs. In this manner, specific FARs to which to forward the packet on the tunnel overlay may be selected based on knowing that the specific FAR has the host route to the particular device according to the IGP instance. In a fully connected tunnel overlay, for example, the advantage of running a separate IGP instance is that it avoids needing to leak host routes outside the FAR domain and provides for traversing at most two FARs to reach a destination within the LLN (e.g., the first improperly receiving FAR, and then the second appropriate FAR).

Figure 9:
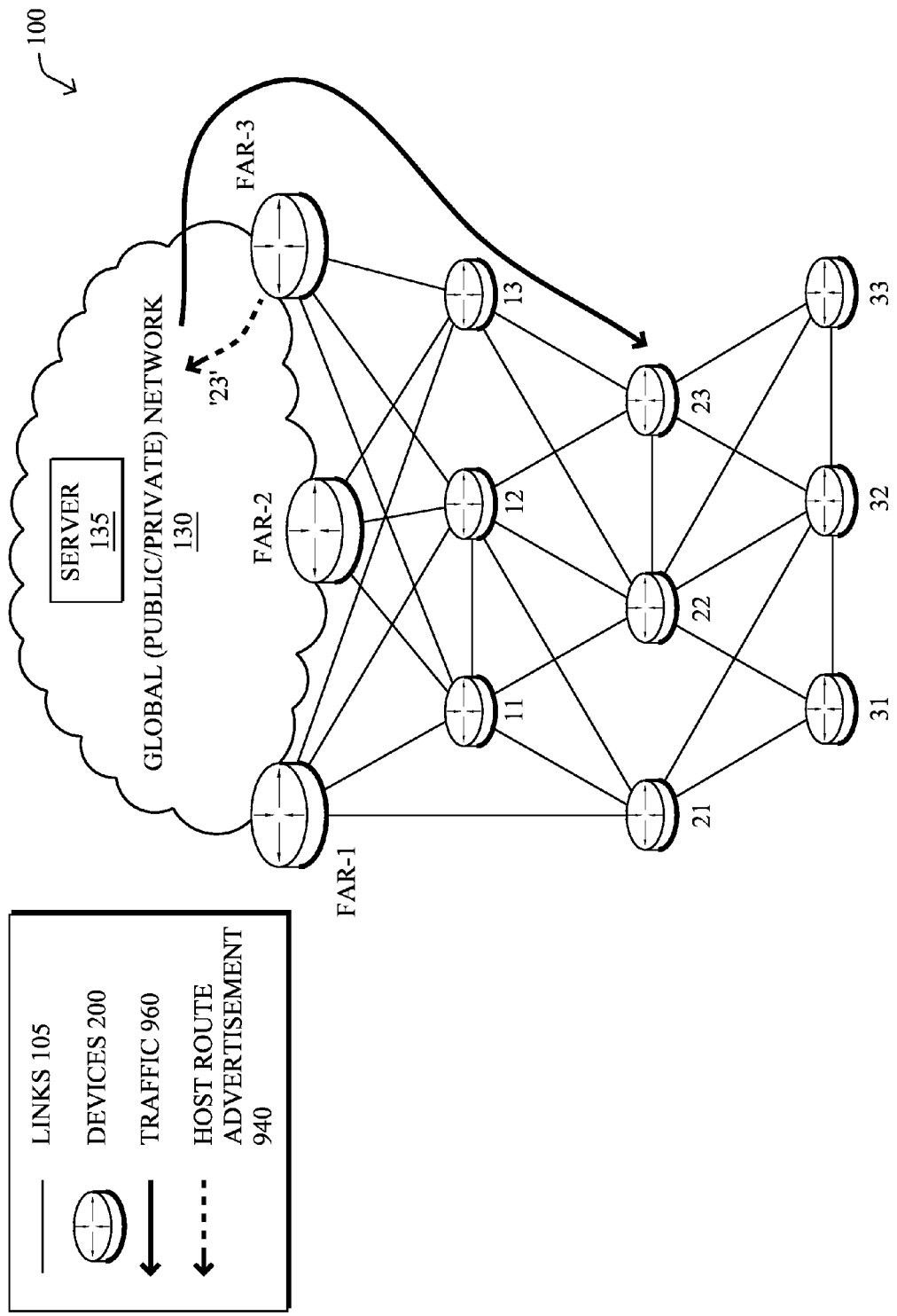
FIG. 9 illustrates an example traffic flow and host route advertisement.

In accordance with one or more additional embodiments herein, a FAR may be configured to only advertise a particular host route across the WAN link if the FAR is actively using the host route to forward packets into the LLN (e.g., a number of packets per second or minute for that destination, class of service of the packets sent to that destination, etc.). As a result, if the host route is not being utilized, no additional overhead is incurred by advertising the host route. If the host route is being utilized (e.g., based on monitoring network traffic 960 as shown in FIG. 9), however, then it may be beneficial to advertise the particular host route (advertisement 940) to ensure that the high(er) volume of traffic may be appropriately routed through the corresponding FAR, alleviating the need to re-forward the traffic over the tunnel overlay within the LLN. Note that this may particularly be the case where the host route does not fall within the corresponding FAR's prefix.

The mechanisms described above can be used to prevent redistributing host routes (e.g., in OSPF), or alternatively to redistribute such host routes for critical packets. However, there are situations where it is highly desirable to redistribute these routes because there are many critical packets, because the link between FAR is costly (for example a 3G link), or because of the additional delay caused by the redirection, etc. In these situations, the techniques herein may be extended to control the size of the LSDB (Link State Database). For example, when the host route overhead (e.g., number of host routes, LSDB size, redirection delay, etc.) exceeds/crosses some threshold, the FAR triggers a network address renumbering so as to defragment the address space in the mesh network (e.g., the LLN).

Figure 10:
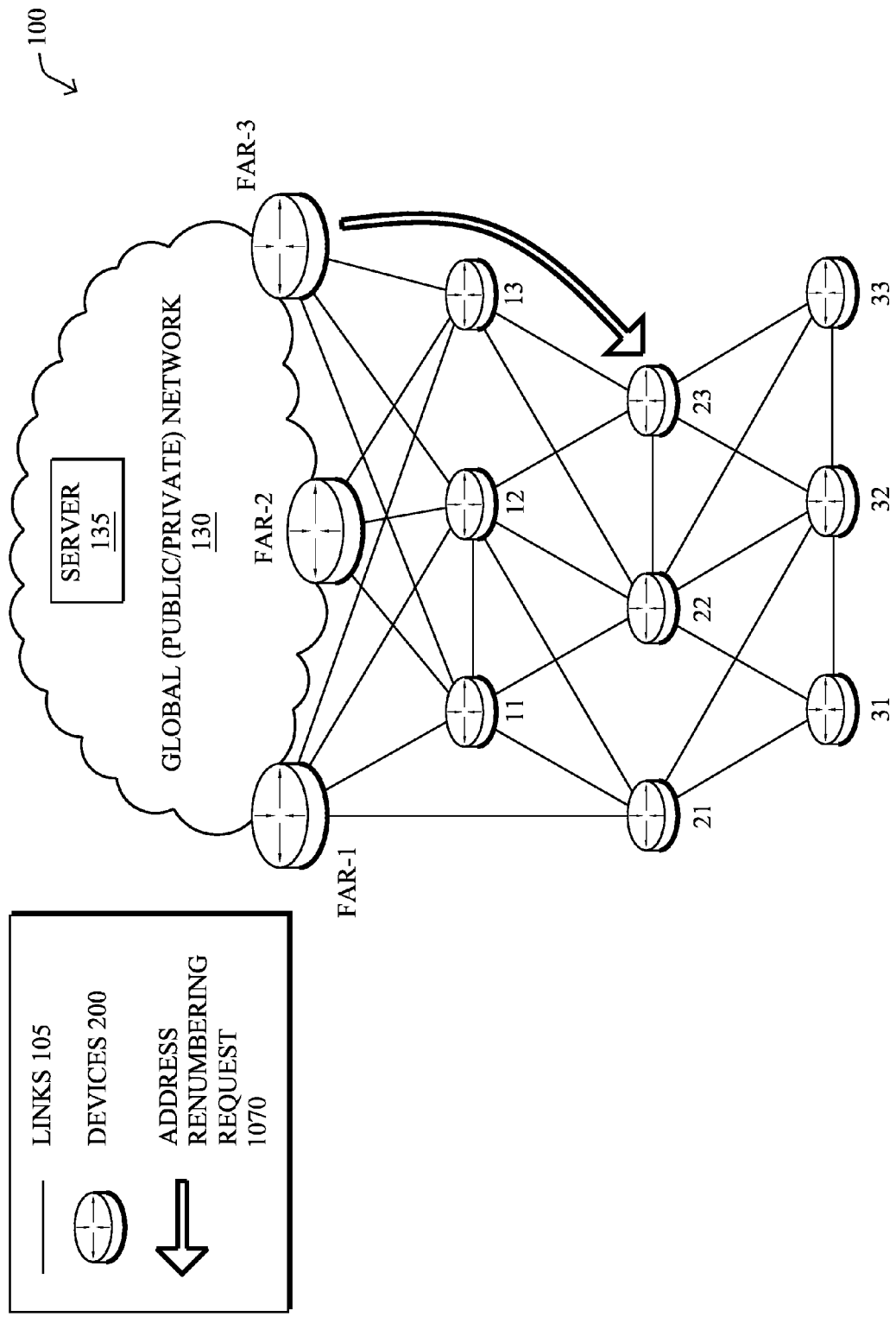
FIG. 10 illustrates an example network address renumbering request.

For instance, as shown in FIG. 10, based on historical data (amount of traffic, urgency of the forwarded traffic, etc.), the FAR may select certain nodes (e.g., node 23) and send a request 1070 proposing these nodes to renumber using an address within the advertised aggregate route (within the request 1070), thus removing the host route from having to be redistributed. As noted, such a trigger may be activated upon crossing some LSDB size, observing lots of additional delays to critical flows, explicit delay requirements to avoid extra-delays for sensitive traffic, etc.

Note that in one or more specific embodiments, host prefixes may also be aggregated. In other words, a FAR may redistribute an aggregated route to other FARs using the IGP running in the tunnels, and not just the host routes. This may also be true for route redistribution in the WAN.

Figure 11:
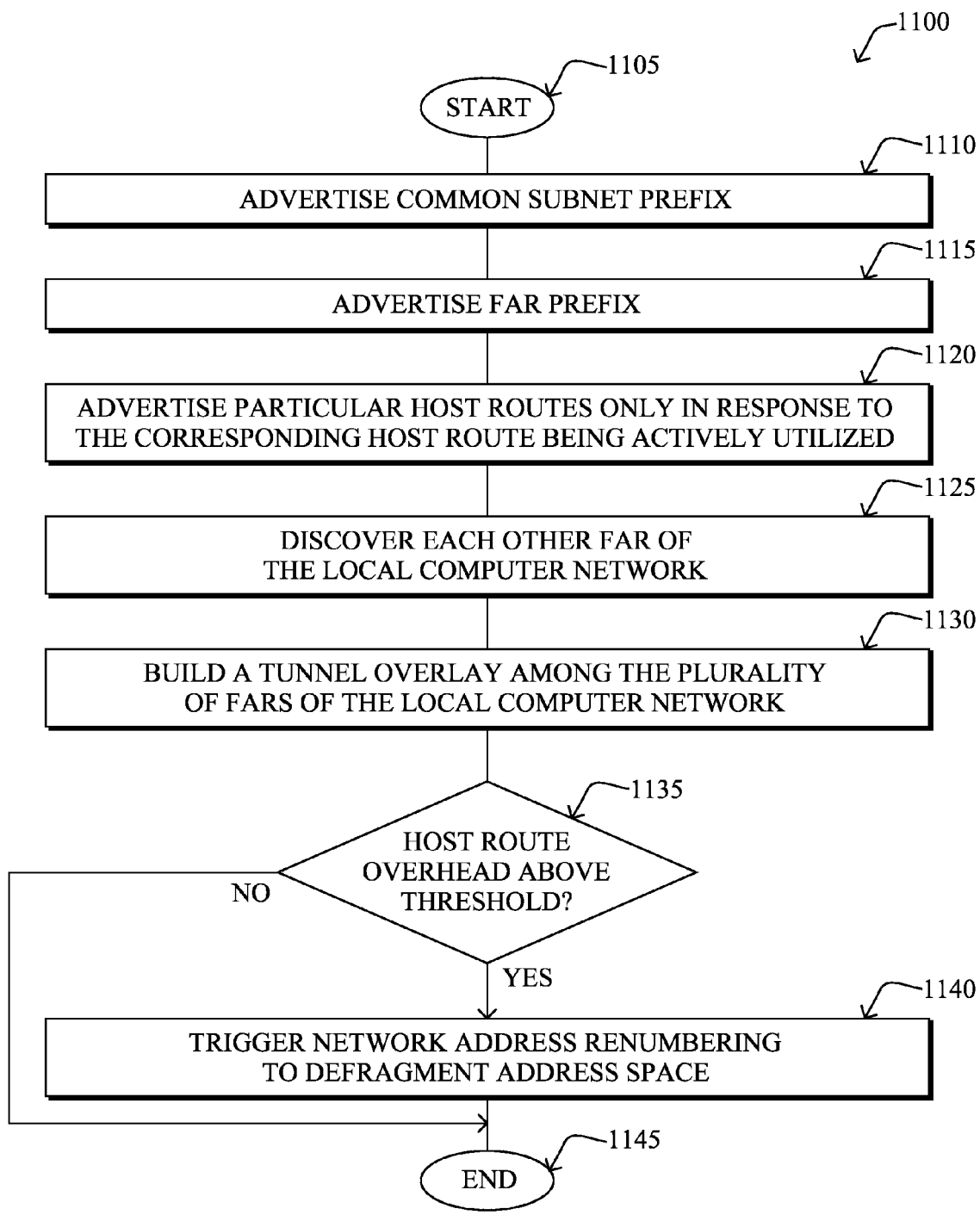
FIG. 11 illustrates an example simplified procedure for managing host routes in mesh networks with a plurality of FARs, particularly from the perspective of the FARs.

FIG. 11 illustrates an example simplified procedure for managing host routes in local computer networks (e.g., mesh networks) with a plurality of FARs in accordance with one or more embodiments described herein, particularly from the perspective of the FARs. The procedure 1100 starts at step 1105, and continues to step 1110, where, as described in greater detail above, the FARs (e.g., FAR-1, FAR-2, and FAR-3) each advertise a common subnet prefix, and also their associated FAR prefix in step 1115. As mentioned above, in one embodiment, in step 1120 the FARs may also advertise any particular host routes, but only in response to the corresponding host route being actively utilized.

Based on discovering each other FAR of the mesh network in step 1125, the FARs may correspondingly build a tunnel overlay among themselves in step 1130, as described above. Also, as mentioned above, if at any time during operation of the network the host route overhead becomes greater than a particular threshold in step 1135, then network address renumbering may be triggered in step 1140 in order to defragment the address space. The procedure 1100 ends in step 1145, though, notably, may continue from any step within procedure 1100, such as advertising updates, revising or maintaining various tunnels, etc.

Figure 12:
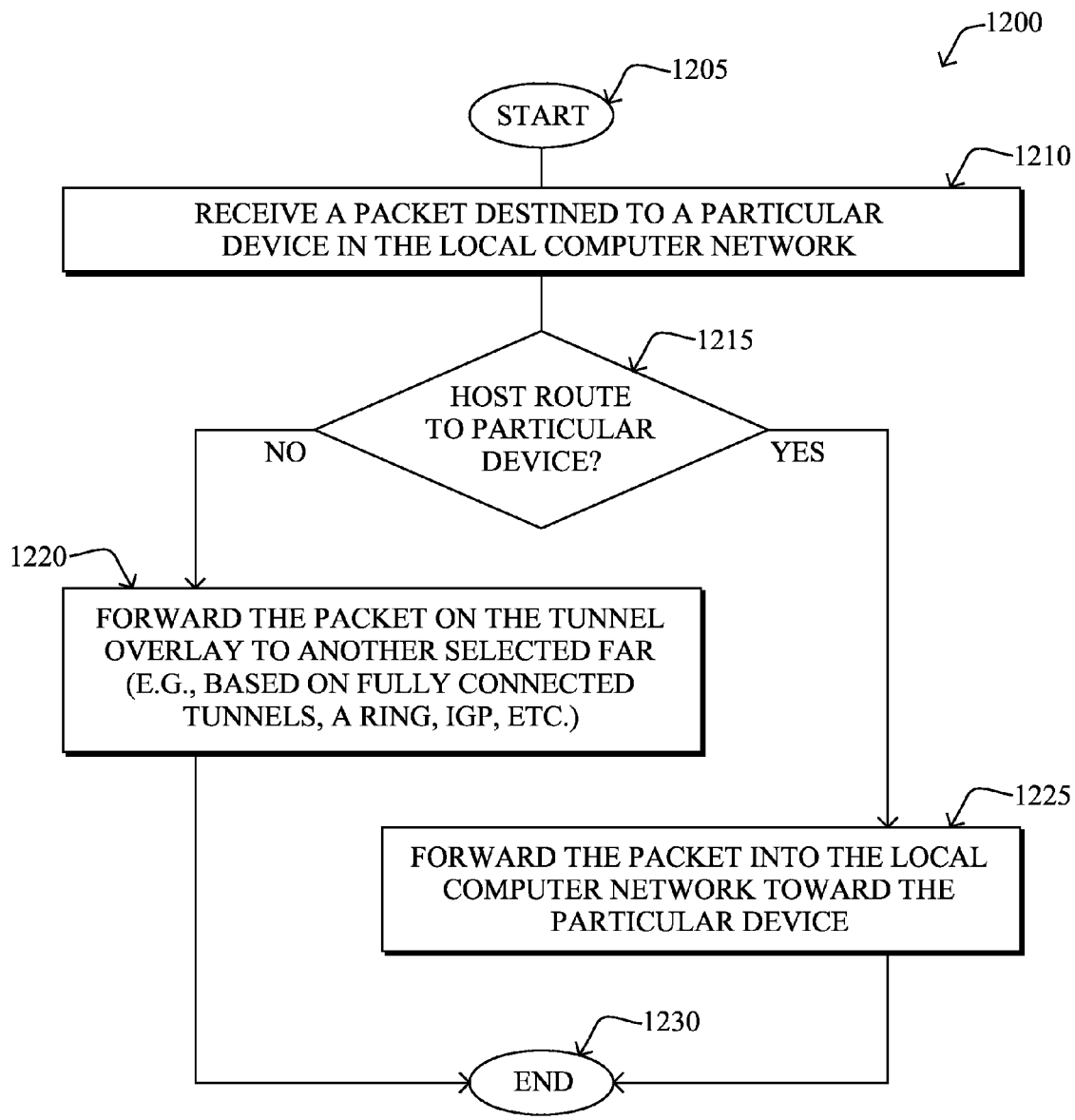
FIG. 12 illustrates an example simplified procedure for managing host routes in mesh networks with a plurality of FARs, particularly with respect to handling packets at the FARs.

In addition, FIG. 12 illustrates an example simplified procedure for managing host routes in local computer networks with a plurality of FARs in accordance with one or more embodiments described herein, particularly with respect to handling packets at the FARs. The procedure 1200 starts at step 1205 (e.g., after at least building the tunnel overlay in step 1130 in procedure 1100 of FIG. 11 above), and continues to step 1210, where an FAR (e.g., FAR-1) receives a packet 140 destined to a particular device in the mesh network (e.g., node 23). Note that in step 1210, the packet may be received from the global computer network (e.g., WAN), or from another FAR within the mesh network (e.g., LLN).

If the receiving FAR does not have the host route to the particular device in step 1215, then in step 1220 the receiving FAR forwards the packet on the tunnel overlay to another selected FAR. For example, as noted above, the selection of the subsequent FAR may be based on fully connected tunnels (e.g., maintaining a list 832 of visited FARs), a ring of tunnels (e.g., ensuring that the ring is only traversed once), or directly referencing IGP knowledge to select the appropriate FAR, accordingly.

Once a FAR that receives the packet in step 1210 does have the host route for the particular device in step 1215, then in step 1225 that particular FAR simply forwards the packet into the mesh network toward the particular device. The illustrative procedure 1200 ends in step 1230.

It should be noted that while certain steps within procedures 1100-1200 may be optional as described above, the steps shown in FIGS. 11-12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1100-1200 are described separately, certain steps from each procedure may be incorporated into each other procedure, and the two procedures are not meant to be mutually exclusive.

The novel techniques described herein, therefore, manage host routes in local computer networks (e.g., mesh networks) with a plurality of FARs. In particular, the techniques herein minimize the amount of necessary WAN traffic required for routing packets into a mesh network, such as an LLN. For instance, a system in accordance with the embodiments described herein: 1) reduces the communication required to advertise host routes, such as by using aggregated prefixes whenever possible and only advertising host routes that are actively being used, 2) reduces the number of host routes advertised outside of the FARs, such as by allowing any FAR to receive and forward traffic destined to the LLN, and 3) reduces the size of the link state database (LSDB), such as by triggering network address renumbering operations when address space fragmentation becomes too high.

While there have been shown and described illustrative embodiments that manage host routes in local computer networks with a plurality of FARs, it is to be understood that various other adaptations and modifications may be made within the spirit and scope of the embodiments herein. For example, the embodiments have been shown and described herein with relation to mesh networks such as LLNs and sensor networks. However, the embodiments in their broader sense are not as limited, and may, in fact, be used with other types of local computer networks. In addition, while certain protocols are shown, such as RPL or certain IGPs, other suitable protocols may be used, accordingly. Note also, that while the description has been primarily focused on FARs, other types of devices may also benefit from the embodiments herein, such as root nodes, LLN border routers (LBRs), etc., and the embodiments herein are not meant to be limited to devices called "FARs," but rather to any device responsible for taking traffic from a global computer network and forwarding it to a particular device within a local computer network.

Moreover, in addition to or as an alternate to creating point-to-point (P2P) tunnels 620 between any pair of FARs, the techniques herein may emplace other types of communication between the FARs. For example, the system may establish a multicast address to which all of the FARs listen and or establish a virtual private network (VPN) amongst all the FARs. In accordance with one specific embodiment, the message exchange between the FARs may then be encrypted using well known protocols such as Group Encryption Transport (GET) VPN.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   advertising, into a global computer network, from a particular field area router (FAR) in a local computer network having a plurality of FARs, a common subnet prefix assigned to the local computer network, wherein each of the plurality of FARs of the local computer network is configured to accept any traffic destined to the local computer network;
   building a tunnel overlay among the plurality of FARs of the local computer network;
   receiving a packet at the particular FAR destined to a particular device in the local computer network;
   in response to the particular FAR not having a host route to the particular device, selecting a specific FAR of the plurality of FARs to forward the packet to on the tunnel overlay based on the specific FAR having the host route to the particular device and forwarding the packet on the tunnel overlay to the selected FAR; and
   triggering network address renumbering in the local computer network to defragment address space in the local computer network when overhead of the host route crosses a given threshold.

2. The method as in claim 1, wherein the packet is received at the particular FAR from the global computer network.

3. The method as in claim 1, wherein the packet is received at the particular FAR from another FAR of the local computer network.

4. The method as in claim 1, further comprising:
   advertising, into the local computer network and global computer network from the particular FAR, a FAR prefix that falls within the common subnet prefix.

5. The method as in claim 4, wherein one or more devices in the local computer network that communicate through the particular FAR configure their addresses based on the FAR prefix for the particular FAR.

6. The method as in claim 1, further comprising:
   discovering, by the particular FAR, each other of the plurality of FARs of the local computer network.

7. The method as in claim 1, further comprising:
   in response to the particular FAR having the host route to the particular device, forwarding the packet into the local computer network toward the particular device.

8. The method as in claim 1, further comprising:
   maintaining an Interior Gateway Protocol (IGP) instance among the plurality of FARs; and
   selecting the specific FAR of the plurality of FARs to which to forward the packet on the tunnel overlay based on the specific FAR having the host route to the particular device according to the IGP instance.

9. The method as in claim 1, further comprising:
   advertising particular host routes to devices of the local computer network from the particular FAR only in response to the corresponding host route being actively utilized.

10. The method as in claim 1, wherein the given threshold is selected from a group consisting of:
    link state database (LSDB) size and delay.

11. An apparatus, comprising:
    a network interface to communicate in a local computer network having a plurality of field area routers (FARs);
    a network interface to communicate in a global computer network;
    a processor coupled to the network interfaces and adapted to execute one or more processes; and
    a memory configured to store a FAR process executable by the processor, the process when executed operable to:
    advertise, into the global computer network, a common subnet prefix assigned to the local computer network, wherein each of the plurality of FARs of the local computer network is configured to accept any traffic destined to the local computer network;
    build a tunnel overlay among the plurality of FARs of the local computer network; receive a packet destined to a particular device in the local computer network;
    in response to the apparatus not having a host route to the particular device, selecting a specific FAR of the plurality of FARs to forward the packet to on the tunnel overlay based on the specific FAR having the host route to the particular device and forwarding the packet on the tunnel overlay to the selected FAR; and trigger network address renumbering in the local computer network to defragment address space in the local computer network when overhead of the host route crosses a given threshold.

12. The apparatus as in claim 11, wherein the process when executed is further operable to:
   advertise, into the local computer network and global computer network from the particular apparatus, a FAR prefix that falls within the common subnet prefix, wherein one or more devices in the local computer network that communicate through the particular apparatus configure their addresses based on the FAR prefix for the apparatus.

13. The apparatus as in claim 11, wherein the process when executed is further operable to:
   maintain an Interior Gateway Protocol (IGP) instance among the plurality of FARs; and
   select the specific FAR of the plurality of FARs to which to forward the packet on the tunnel overlay based on the specific FAR having the host route to the particular device according to the IGP instance.

14. The apparatus as in claim 11, wherein the process when executed is further operable to:
   advertise particular host routes to devices of the local computer network only in response to the corresponding host route being actively utilized.

15. A tangible, non-transitory, computer-readable media having software encoded thereon, the software, when executed by a processor on a particular field area router (FAR) in a local computer network having a plurality of FARs, operable to:
   advertise, into a global computer network, a common subnet prefix assigned to the local computer network, wherein each of the plurality of FARs of the local computer network is configured to accept any traffic destined to the local computer network;
   build a tunnel overlay among the plurality of FARs of the local computer network; receive a packet destined to a particular device in the local computer network;
   in response to the particular FAR not having a host route to the particular device, selecting a specific FAR of the plurality of FARs to forward the packet to on the tunnel overlay based on the specific FAR having the host route to the particular device and forwarding the packet on the tunnel overlay to the selected FAR; and
   trigger network address renumbering in the local computer network to defragment address space in the local computer network when overhead of the host route crosses a given threshold.

16. The computer-readable media as in claim 15, wherein the software when executed is further operable to select a specific FAR of the plurality of FARs to which to forward the packet on the tunnel overlay wherein an Interior Gateway Protocol (IGP) instance is maintained among the plurality of FARs, and wherein the technique selects the specific FAR of the plurality of FARs to which to forward the packet on the tunnel overlay based on the specific FAR having the host route to the particular device according to the IGP instance.

17. The computer-readable media as in claim 15, wherein the software when executed is further operable to:
   advertise, into the local computer network and global computer network from the particular FAR, a FAR prefix that falls within the common subnet prefix, wherein one or more devices in the local computer network that communicate through the particular FAR configure their addresses based on the FAR prefix for the particular FAR.

* * * * *